("(12) United States Patent" / "Takase et al.")

United States Patent

Takase et al.

(10) Patent No.: US 9,960,401 B2
(45) Date of Patent: May 1, 2018

(54) WIRING MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Shinichi Takase, Yokkaichi (JP); Junichi Wakayama, Yokkaichi (JP); Tetsuji Tanaka, Yokkaichi (JP); Hiroki Hirai, Yokkaichi (JP)

(73) Assignees: AUTONETWORKS TECHNOLOGIES, LTD., Mie (JP); SUMITOMO ELECTRIC INDUSTRIES, LTD., Osaka (JP); SUMITOMO WIRING SYSTEMS, LTD., Mie (JP)

( * ) Notice: Subject to any disclaimer, the term of this patent is extended or adjusted under 35 U.S.C. 154(b) by 36 days.

(21) Appl. No.: 14/655,232

(22) PCT Filed: Dec. 24, 2013

(86) PCT No.: PCT/JP2013/084409
§ 371 (c)(1),
(2) Date: Jun. 24, 2015

(87) PCT Pub. No.: WO2014/103979
PCT Pub. Date: Jul. 3, 2014

(65) Prior Publication Data
US 2016/0197330 A1 Jul. 7, 2016

(30) Foreign Application Priority Data

Dec. 25, 2012 (JP) ................. 2012-280539

(51) Int. Cl.
*H01M 2/20* (2006.01)
*H01M 10/48* (2006.01)
(Continued)

(52) U.S. Cl.
CPC .......... *H01M 2/206* (2013.01); *B60R 16/033* (2013.01); *H01M 2/22* (2013.01); *H01M 10/482* (2013.01);
(Continued)

(58) Field of Classification Search
CPC .............................. H01M 2/206; H01M 2/22
(Continued)

(56) References Cited

U.S. PATENT DOCUMENTS 6,152,776 A    11/2000   Ikeda et al.
7,048,562 B2 *   5/2006   Lutsch .................... H01R 4/20
                                                                                         439/275
(Continued)

FOREIGN PATENT DOCUMENTS

JP    H11-120987 A    4/1999
JP    2010-225449 A    10/2010
(Continued)

*Primary Examiner* — Alexander Gilman
(74) *Attorney, Agent, or Firm* — Oliff PLC

(57) ABSTRACT

A wiring module to be attached to a battery module including a single cell group in which a plurality of single cells having positive and negative electrode terminals are lined up includes a connection member that is made of aluminum or an aluminum alloy and that electrically connects adjacent electrode terminals to each other and a voltage detection wire formed by coating a core wire made of aluminum or aluminum alloy with an insulation coating. An exposed core wire that is exposed at an end portion of the voltage detection wire is connected to the connection member by welding.

6 Claims, 9 Drawing Sheets

(51) Int. Cl.
*B60R 16/033* (2006.01)
*H01M 2/22* (2006.01)
*H01M 2/10* (2006.01)

(52) U.S. Cl.
CPC ...... *H01M 2/1077* (2013.01); *H01M 2220/20* (2013.01)

(58) Field of Classification Search
USPC ............................................. 439/627
See application file for complete search history.

(56) References Cited

U.S. PATENT DOCUMENTS

| | | | | |
|---|---|---|---|---|
| 9,150,115 B2* | 10/2015 | Ikeda | ................... | H02G 3/0437 |
| 9,214,752 B2* | 12/2015 | Liu | ..................... | H01M 2/202 |
| 9,263,722 B2* | 2/2016 | Ikeda | ................... | H01M 2/204 |
| | | | | 174/254 |
| 9,379,460 B2* | 6/2016 | Miyamoto | ............... | H01R 4/62 |
| 2012/0217060 A1 | 8/2012 | Kusakari et al. | | |
| 2012/0315807 A1 | 12/2012 | Sakae | | |
| 2013/0280959 A1 | 10/2013 | Takase et al. | | |
| 2014/0202763 A1* | 7/2014 | Adachi | ................. | H01R 13/504 |
| | | | | 174/72 A |
| 2014/0295225 A1* | 10/2014 | Okamoto | .............. | H01M 2/206 |
| | | | | 429/65 |
| 2014/0370343 A1* | 12/2014 | Nomoto | ............ | H01M 10/4207 |
| | | | | 429/90 |

FOREIGN PATENT DOCUMENTS

| | | |
|---|---|---|
| JP | 2011-210481 A | 10/2011 |
| JP | 2012-199007 A | 10/2012 |
| JP | 2012-241254 A | 12/2012 |
| JP | 2012-252781 A | 12/2012 |
| WO | 11/052644 A1 | 5/2011 |

\* cited by examiner

WIRING MODULE

TECHNICAL FIELD

The exemplary embodiment relates to a wiring module.

BACKGROUND ART

Battery modules including a single cell group in which a plurality of single cells are lined up are installed in electric vehicles, hybrid cars, and the like.

There are cases where a wiring module is attached to such battery modules, the wiring module including busbars that each electrically connect electrode terminals of adjacent single cells to each other, resin protectors that hold the busbars, voltage detection terminals that are attached to the busbars in an overlapping manner and that detect the voltage of the single cells, and voltage detection wires that are connected to the voltage detection terminals (see JP 2012-199007A).

SUMMARY

Technical Problem

In conventional wiring modules including the above-described wiring module disclosed in JP 2012-199007A, it is common to use busbars and voltage detection terminals made of copper or a copper alloy. Thus, there is a problem that the overall weight of a wiring module increases.

The exemplary embodiment was made in view of these circumstances, and it is an object thereof to provide a wiring module having a reduced weight.

Solution to Problem

To solve the above-described problem, a wiring module according to the exemplary embodiment is a wiring module to be attached to a battery module including a single cell group in which a plurality of single cells having positive and negative electrode terminals are lined up, the wiring module including a connection member that is metallic, for example, aluminum or an aluminum alloy, and that electrically connects adjacent electrode terminals of the electrode terminals to each other, and a voltage detection wire formed by coating a core wire metallic, for example, aluminum or an aluminum alloy, with an insulation coating, wherein an exposed core wire that is exposed at an end portion of the voltage detection wire is connected to the connection member by welding.

In the exemplary embodiment, since the end portion of the voltage detection wire is connected, by welding, to the connection member that connects adjacent electrode terminals to each other, the necessity for a voltage detection terminal connected to the electrode terminals is eliminated. Moreover, the connection member and the core wire of the voltage detection wire that are used in the exemplary embodiment are metallic, for example, aluminum or an aluminum alloy, resulting in a more lightweight wiring module than in the case where busbars and the like made of copper or a copper alloy are used. Therefore, according to the exemplary embodiment, a wiring module having a reduced weight can be provided.

Furthermore, according to the exemplary embodiment, since the connection member and the core wire of the voltage detection wire are composed of the same metal material, the occurrence of galvanic corrosion due to, for example, intrusion of water containing salt can also be prevented in a connection portion where the core wire and the connection member are brought into contact with each other.

The exemplary embodiment may also have the following configurations.

The connection member may be provided with a crimping portion that is crimped onto the voltage detection wire.

With this configuration, the voltage detection wire can be held by the crimping portion.

A configuration may also be adopted in which the connection member has a terminal connection portion connected to the electrode terminals and a wire connection portion connected to the exposed core wire, and an upwardly extending portion extending upward from the terminal connection portion is provided between the terminal connection portion and the wire connection portion.

Since the voltage detection wire connected to the connection member is pulled during routing to the battery module, the voltage detection wire is likely to be disconnected from the connection member due to a stress that is applied to the connection portion (wire connection portion) between the connection member and the voltage detection wire. However, with the above-described configuration, the stress is alleviated by the upwardly extending portion between the wire connection portion and the terminal connection portion, of the connection member, to which the electrode terminals are connected.

A configuration may also be adopted in which the wiring module includes a resin protector that holds the connection member, wherein the resin protector is provided with a wire holding portion that holds a portion of the voltage detection wire that is connected to the connection member.

With this configuration, since that portion of the voltage detection wire that is connected to the connection member is held by the resin protector, a state in which the voltage detection wire and the connection member are connected to each other can be favorably maintained, and the connection reliability can be enhanced.

Advantageous Effects

According to the exemplary embodiment, it is possible to provide a wiring module having a reduced weight.

DESCRIPTION OF EMBODIMENTS

The exemplary embodiment will be described with reference to FIGS. 1 to 9.

In the exemplary embodiment, a battery module M1 includes a single cell group 11 in which a plurality of single cells 12 are lined up, and a wiring module 10 that is attached to the single cell group 11.

Figure 2:
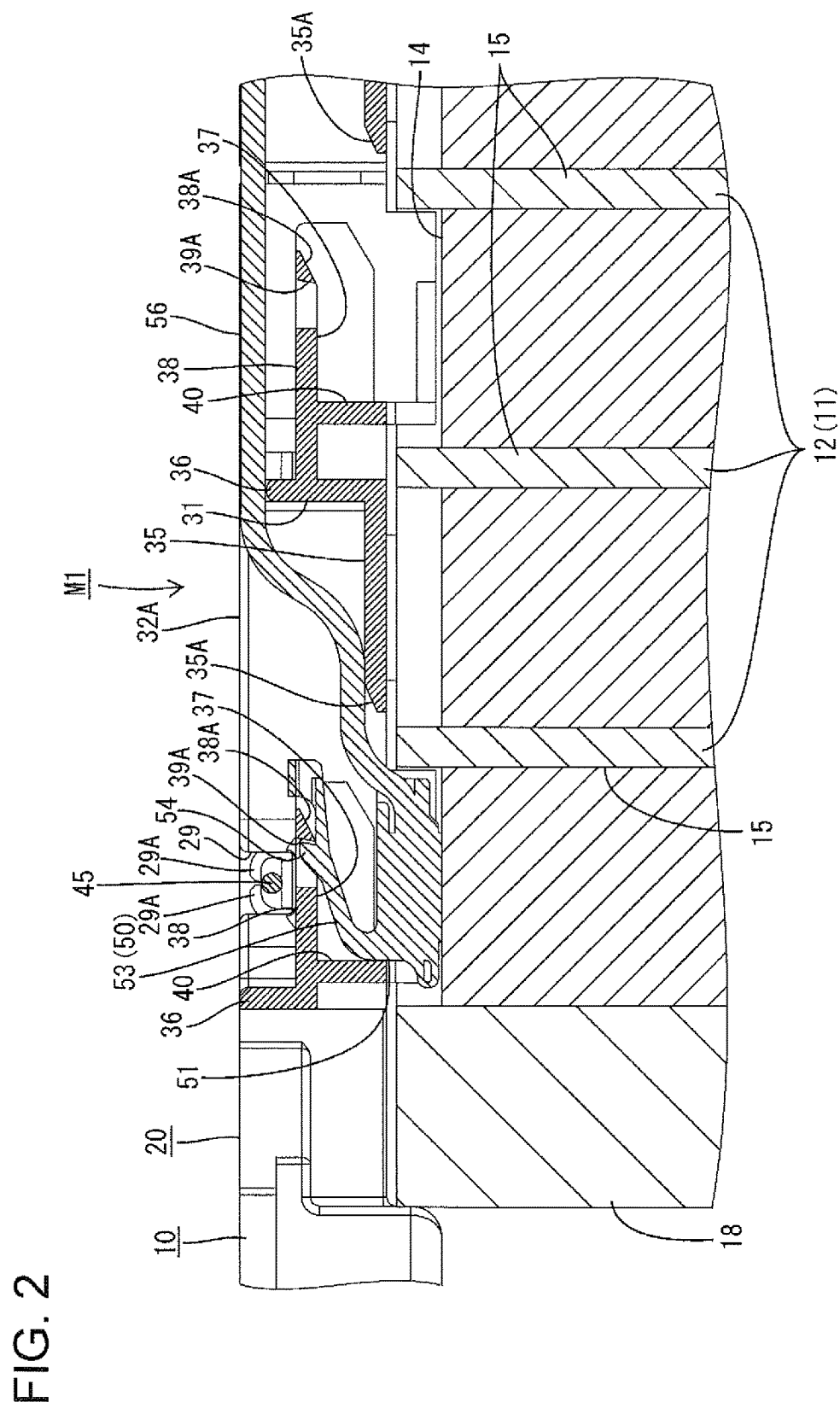
FIG. 2 is a partial cross-sectional view taken along line A-A in FIG. 1.
Figure 3:
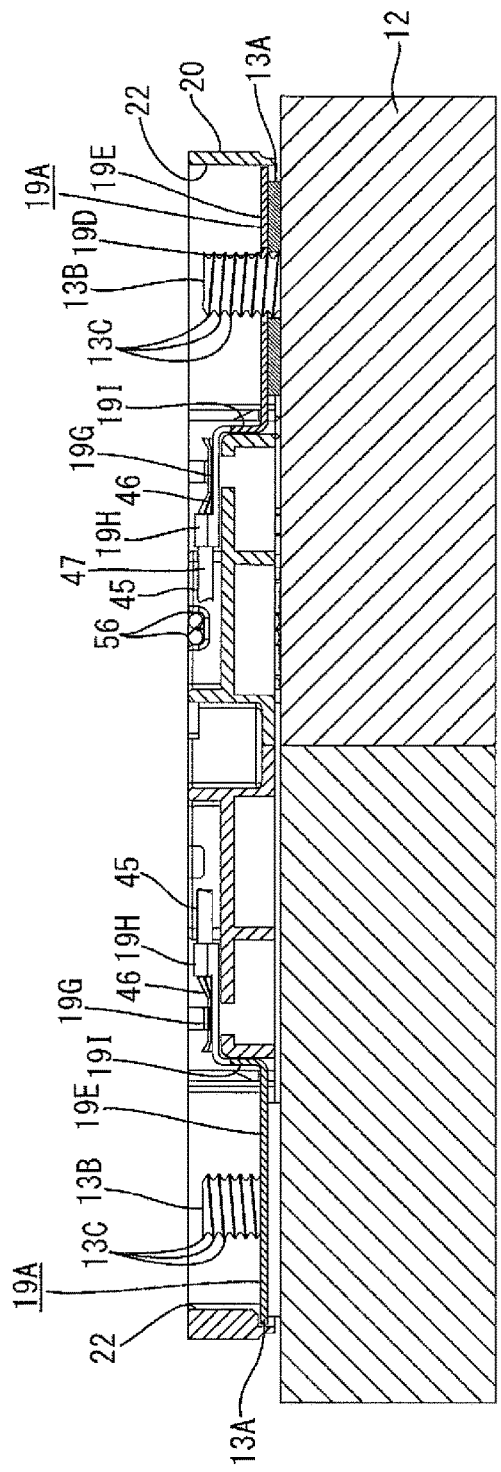
FIG. 3 is a partial cross-sectional view taken along line B-B in FIG. 1.

The battery module M1 is installed in an electric vehicle, a hybrid vehicle, or the like and used as a driving power source. In the following description, the upper side of FIGS. 2 and 3 is regarded as the upper side, and the lower side of FIGS. 2 and 3 is regarded as the lower side.

Single Cell Group 11

Figure 4:
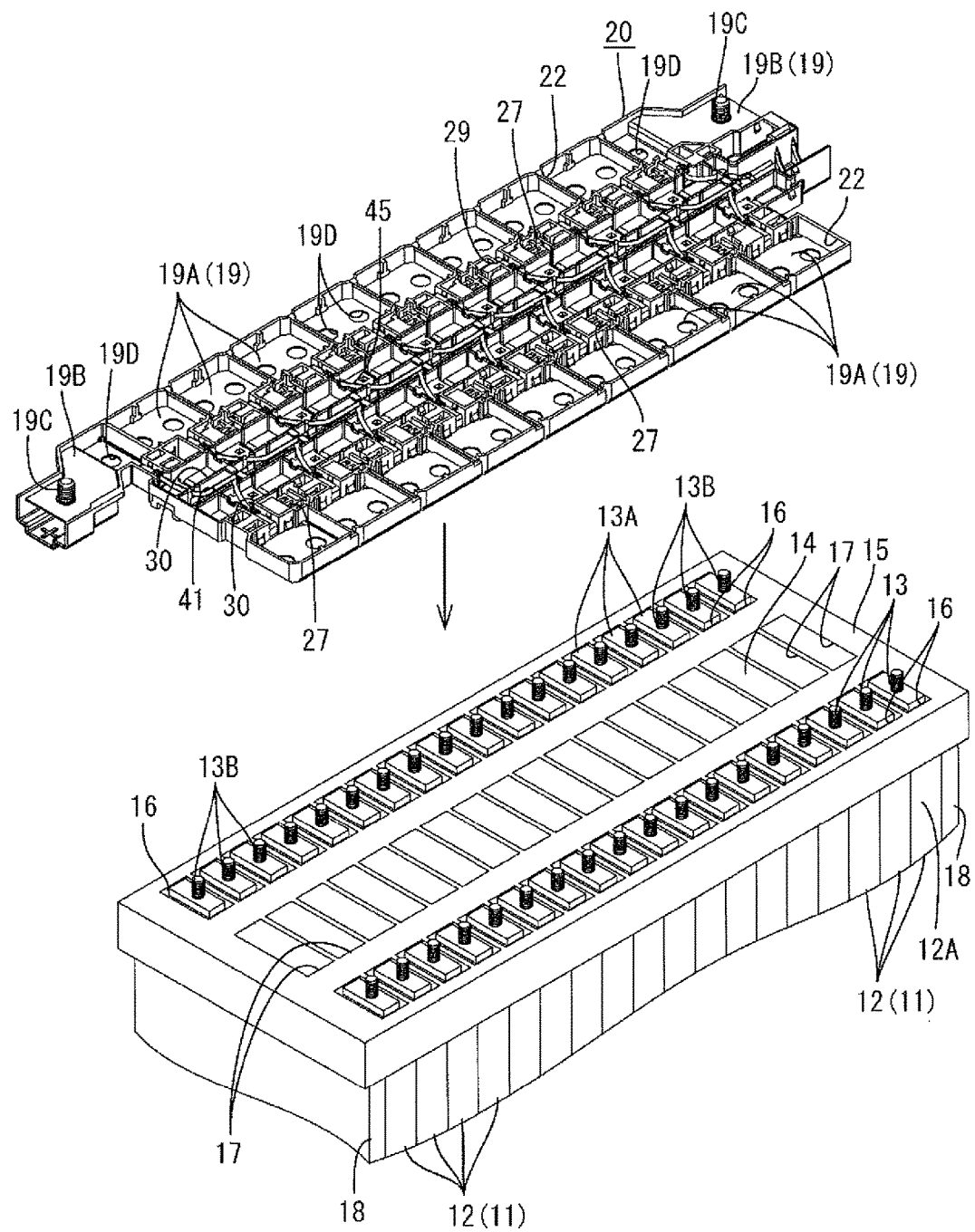
FIG. 4 is a perspective view showing how a resin protector is attached to a single cell group.

As shown in FIG. 4, the battery module M1 includes the single cell group 11 in which the plurality of single cells 12 are lined up. Sandwiching plates 18 made of an insulating resin are disposed at both end portions of the single cell group 11, sandwiching the single cell group 11. Moreover, a separator 15 made of an insulating resin is attached to an upper surface of the single cell group 11 (upper surfaces 14 of the single cells 12).

Rectangular terminal arrangement holes 16 into which a pair of electrode terminals 13 of each single cell 12 are inserted are formed in the separator 15 so as to be lined up in two rows in a longitudinal direction. Moreover, rectangular sensor arrangement holes 17 in which the temperature sensor 50 is disposed are formed in the separator 15 between the two rows of the terminal arrangement holes 16.

Single Cell 12

As shown in FIG. 4, the single cells 12 constituting the single cell group 11 each have a generally flat rectangular parallelepiped shape. Each of the single cells 12 has a cell main body 12A accommodating a cell element (not shown), and positive and negative electrode terminals 13 formed on the upper surface 14 of the cell main body 12A.

Each electrode terminal 13 includes a terminal block 13A made of metal and protruding upward from the upper surface of the single cell 12 and a bolt-shaped electrode post 13B protruding upward from the terminal block 13A. The terminal block 13A has a rectangular shape. A screw thread 13C to which a nut (not shown) is screwed is formed on an outer surface of the electrode post 13B.

Wiring Module 10

The wiring module 10 is attached to the single cell group 11. This wiring module 10 connects the electrode terminals 13 of different polarities of adjacent single cells 12 to each other and thus connects the plurality of single cells 12 in series.

The wiring module 10 includes a plurality of busbars 19 (an example of a connection member) that connect the electrode terminals 13 of adjacent single cells 12 to each other, voltage detection wires 45 that are connected to the busbars 19 and used to detect the voltage of the single cells 12, the temperature sensor 50 that detects the temperature of the single cells 12, and a resin protector 20 holding the busbars 19 that is made of a synthetic resin and that electrically insulates adjacent busbars 19 from each other.

Resin Protector 20

The resin protector 20 of the exemplary embodiment is constituted by a plurality of units 21. In each unit 21, a busbar holding portion 22 (an example of a connection member holding portion), a coupling portion 27, a sensor holding portion 30, a wire accommodation portion 41, a sensor holding portion 30, a coupling portion 27, and a busbar holding portion 22 are integrally provided in that order from an upper end portion in FIG. 1 so as to be substantially parallel to a direction in which the single cells 12 are lined up.

Busbar Holding Portion 22

Figure 1:
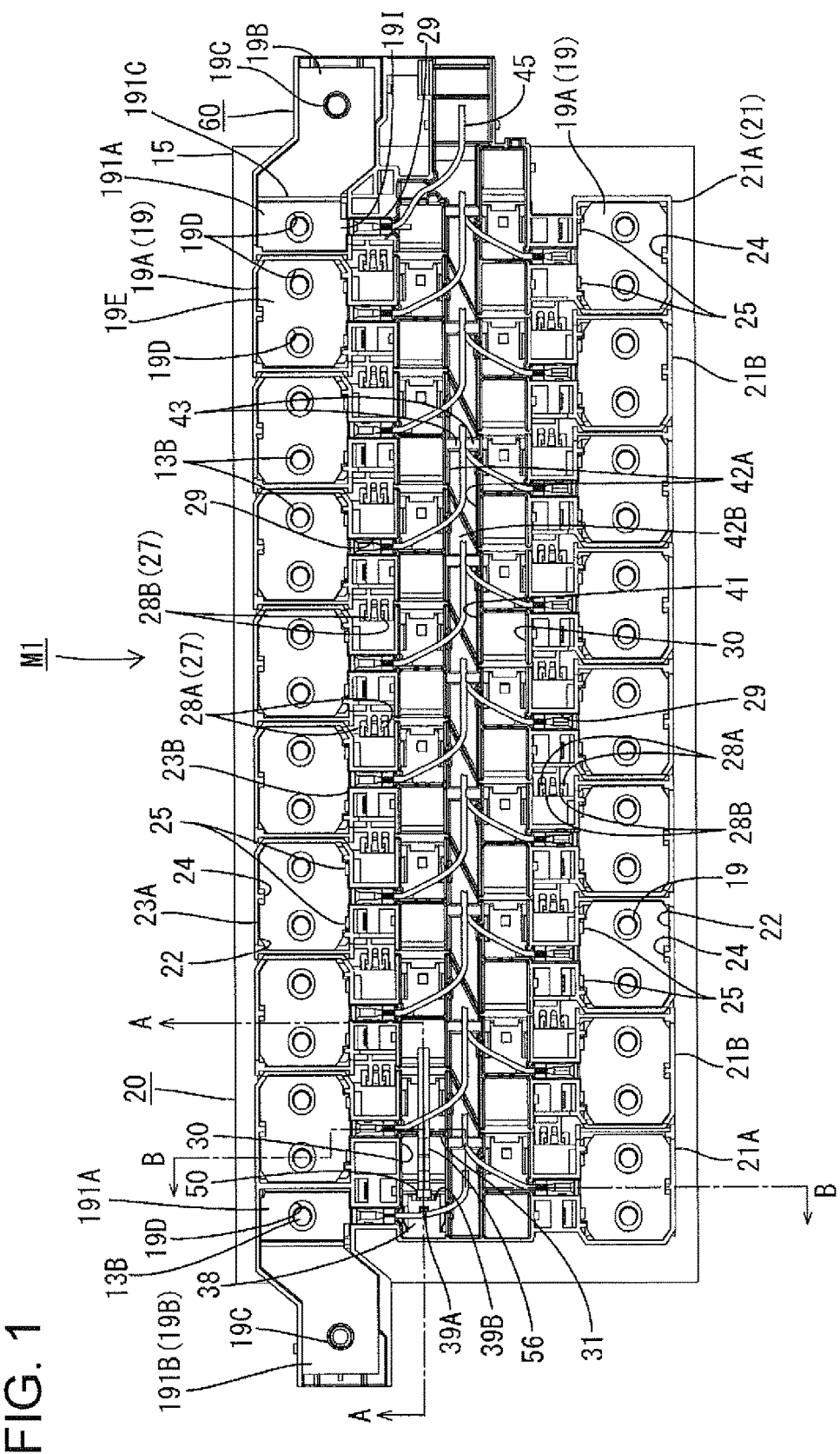
FIG. 1 is a plan view of a battery module including a wiring module according to the exemplary embodiment.

As shown in FIG. 1, the busbar holding portions 22 of respective units 21A at both the left and right end portions protrude outward beyond the respective single cells 12 at the end portions, and external connection busbars 19B are held by the protruding busbar holding portions 22.

Each busbar holding portion 22 includes accommodation walls 23A and 23B that conform to the shape of the corresponding busbar 19. The accommodation wall 23A that is disposed on the outer side, of the pair of accommodation walls 23A and 23B that are arranged substantially parallel to the direction in which the single cells 12 are lined up, is provided with a disengagement preventing protrusion 24 that prevents disengagement of the busbar 19A, while the accommodation wall 23B that is disposed on the inner side is provided with a pair of locking pieces 25 that lock the busbar 19A. A wire lead-out port 26 through which the wire 45 connected to the busbar 19 is lead out is formed between the pair of locking pieces 25. The wire lead-out port 26 is continuous with a wire holding groove 29 formed in the coupling portion 27.

Coupling Portion 27

Two pairs of coupling claws 28A and 28B that are coupled to adjacent units 21 are formed in the coupling portion 27, protruding from opposite end portions thereof. The distance between the pair of coupling claws 28A that are formed at a right end portion (right end portion in FIG. 1) of the unit 21 is set to be larger than the distance between the pair of coupling claws 28B that are formed at an end portion (left end portion FIG. 1) on the opposite side. The coupling claws 28A and 28B that are adjacent to each other are configured to engage with each other. In a coupled state, the plurality of units 21 can be moved in the direction in which the single cells 12 are lined up so as to adjust to any deviation in the pitch between the single cells 12.

The wire holding groove 29 (an example of a wire holding portion) that holds the wire 45 is formed between the two pairs of coupling claws 28A and 28B, extending continuously with the wire lead-out port 26. The wire holding groove 29 is configured to hold a portion of the wire 45 that is connected to the busbar 19. Wire retaining portions 29A that prevent the wire 45 from protruding are formed on inner walls of the wire holding groove 29 at an end portion of the wire holding groove 29 on the side of the sensor holding portion 30.

Sensor Holding Portion 30

The sensor holding portion 30 is formed along the coupling portion 27. The sensor holding portion 30 includes a device holding portion 37 in which a main body portion 51 of the temperature sensor 50 that includes a temperature detection device is held, and a lead wire holding portion 31 in which a lead wire 56 connected to the temperature sensor 50 is held and accommodated.

Although the units 21A at the ends include the sensor holding portion 30 in which the device holding portion 37 and the lead wire holding portion 31 are integrally provided, units 21B may include the lead wire holding portion 31 of an adjacent sensor holding portion 30 and the device holding portion 37.

The sensor holding portion 30 includes a pair of side wall portions 32A and 32B that are disposed substantially parallel to the direction in which the single cells 12 are lined up, a separation wall 36 that separates adjacent sensor holding portions 30 from each other, and a bottom wall 35 that connects the pair of side wall portions 32A and 32B to each other.

In the side wall portion 32A that is located on the side of the coupling portion 27, of the pair of side wall portions 32A and 32B, a first opening 33, in which the wire 45 (wire 45 connected to the busbar 19) held in the wire holding groove 29 can be disposed, is formed. In the side wall portion 32B that is located on the side of the wire accommodation portion 41, of the pair of side wall portions 32A and 32B, a second opening 34, in which the wire 45 (wire 45 connected to the busbar 19) can be disposed, is formed. The first opening 33 and the second opening 34 are formed on the side of the device holding portion 37.

In the separation wall 36, which separates adjacent sensor holding portions 30 from each other, a lead wire holding groove 36A, in which the lead wire 56 connected to the temperature sensor 50 is held, is formed.

The bottom wall 35 is provided so as to correspond to the lead wire holding portion 31. In the device holding portion 37, no bottom wall 35 is formed, and thus the temperature sensor 50 held in the device holding portion 37 is allowed to come into direct contact with the single cell 12. The bottom wall 35 is formed continuously with the separation wall 36, and a sloping surface 35A is formed at an end portion of the bottom wall 35. The sloping surface 35A of the bottom wall 35 functions as a guide surface that guides the temperature sensor 50 into the device holding portion 37.

In the device holding portion 37, a square locking hole 39A that receives and locks a locking protrusion 54 of the temperature sensor 50, and a protective wall 38 in which a recess 39B that receives and locks a locking operation portion 55 of the temperature sensor 50 are formed. The protective wall 38 is disposed so as to cover an upper portion of the main body portion 51 of the temperature sensor 50 that includes the temperature detection device, and has the function of protecting the temperature detection device.

A sloping surface 38A is formed at an end portion of the protective wall 38 on the rear side (right side in FIG. 2) with respect to a direction (direction of arrow X in FIG. 5) in which the temperature sensor 50 is attached. This sloping surface 38A also functions as a guide surface that guides the temperature sensor 50 into the device holding portion 37.

This protective wall 38 is formed continuously with the separation wall 36. The protective wall 38 is formed on the right side of the separation wall 36, while the bottom wall 35 is formed on the left side of the separation wall 36 (see FIG. 1). The protective wall 38 is formed at a higher position than the bottom wall 35 (see FIG. 2).

Moreover, in the sensor holding portion 30, a restricting wall 40 is provided that is connected to a lower side of the protective wall 38 and that restricts forward (leftward in FIG. 2) movement of the temperature sensor 50 with respect to the direction in which the temperature sensor 50 is attached.

Wire Accommodation Portion 41

The wire accommodation portion 41 is provided between the two rows of the sensor holding portions 30, and the side wall portions 32A of the respective sensor holding portions 30 individually double as a wire accommodation wall 42A. In the wire accommodation portion 41, an accommodation bottom wall 42B that connects the wire accommodation walls 42A to each other is formed, and the accommodation bottom wall 42B has a parallelogram shape when viewed from above.

A pair of wire retaining pieces 43 that prevent the wire 45 connected to the busbar 19 from protruding are provided at respective upper ends of each pair of wire accommodation walls 42A.

Temperature Sensor 50

The temperature sensor 50 includes the temperature detection device, which is not shown. The temperature detection device may be configured by, for example, a thermistor. A PTC thermistor or an NTC thermistor can be selected as the thermistor as appropriate. Moreover, the temperature detection device is not limited to thermistors, and any device that can detect the temperature can be selected as appropriate.

Figure 5:
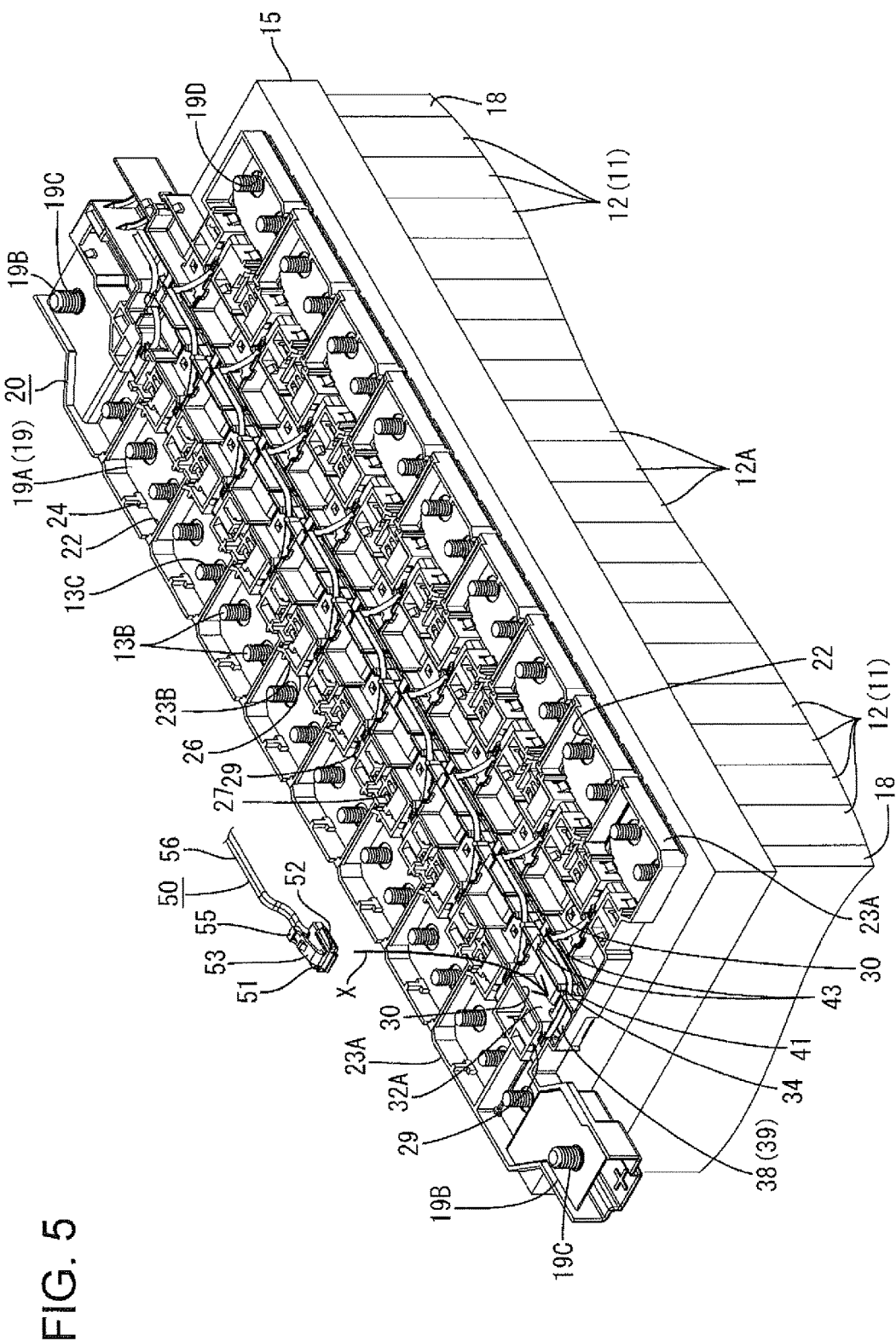
FIG. 5 is a perspective view showing how a temperature sensor is attached to the resin protector.
Figure 6:
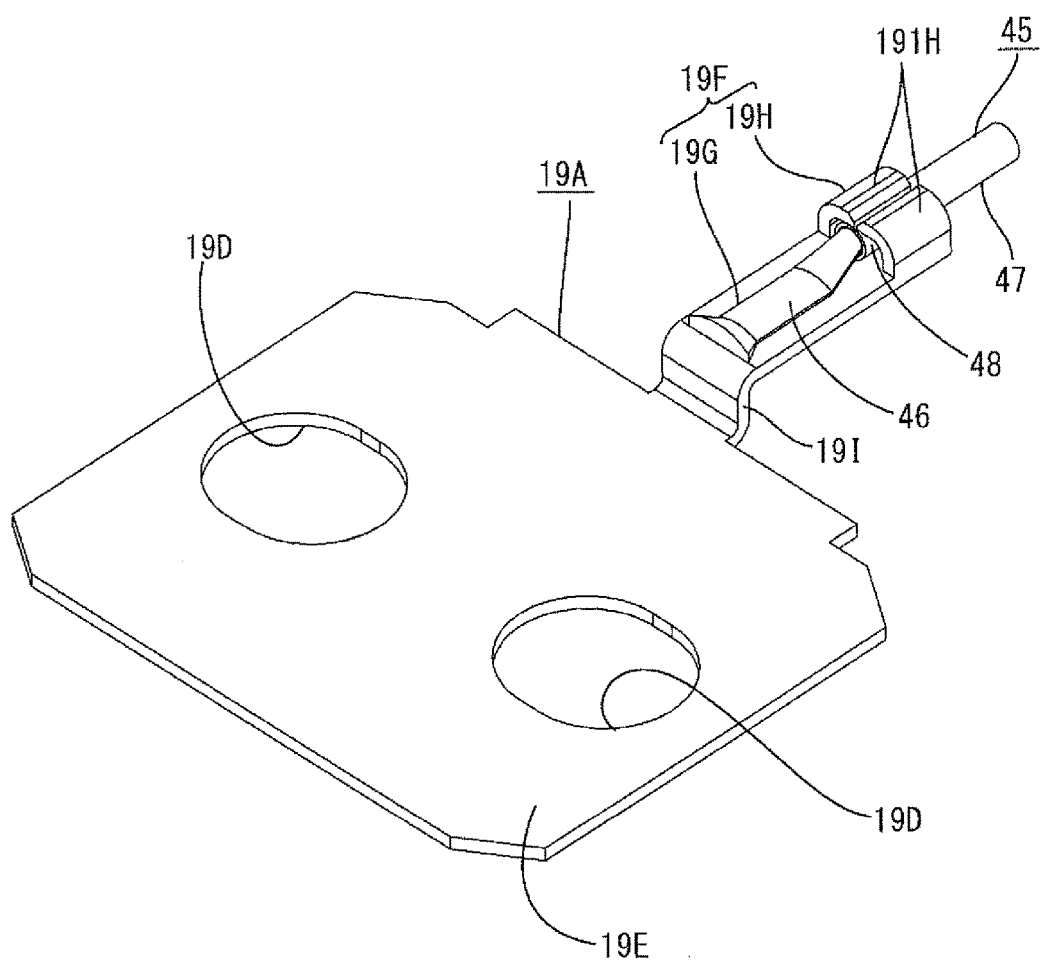
FIG. 6 is a perspective view of a connection member to which a wire is connected.
Figure 7:
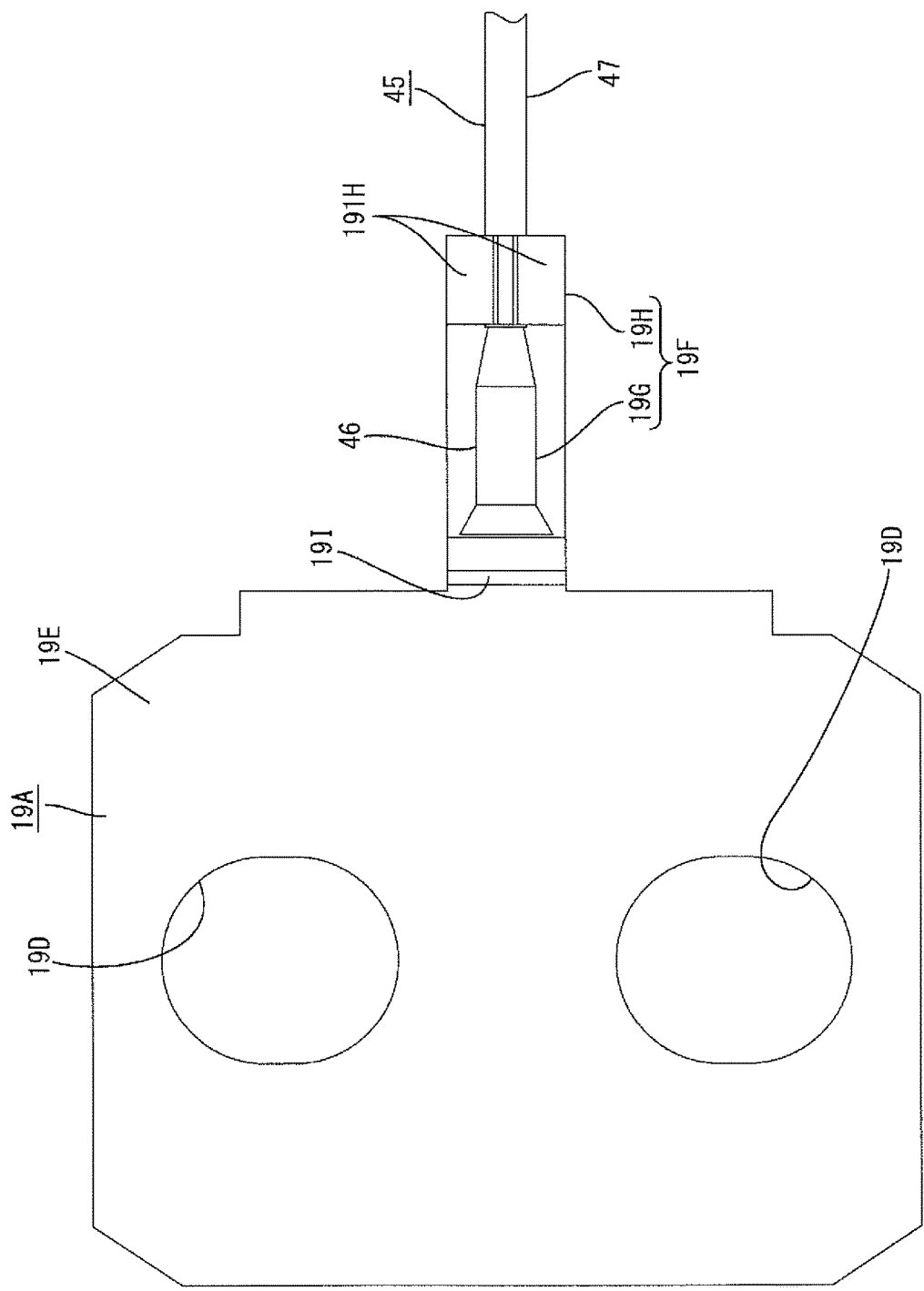
FIG. 7 is a plan view of the connection member to which the wire is connected.
Figure 8:
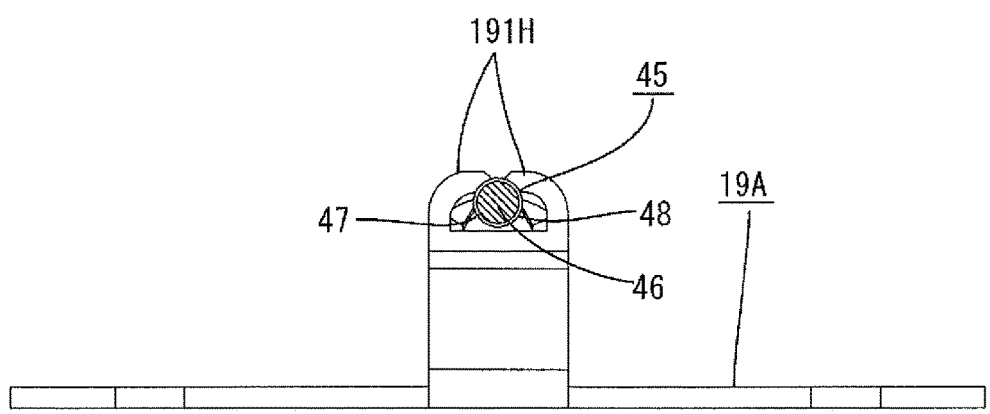
FIG. 8 is a partial cross-sectional view of the connection member to which the wire is connected.
Figure 9:
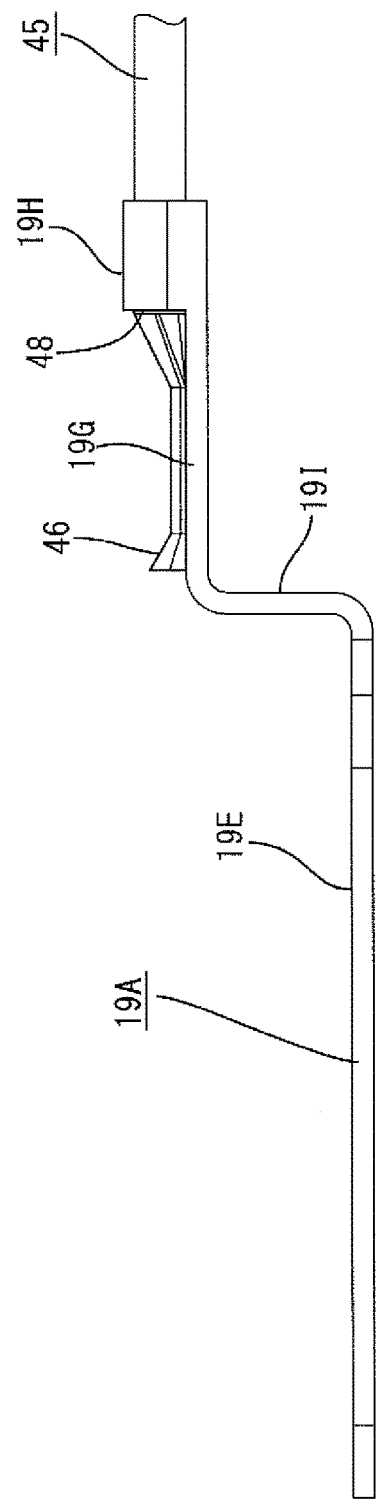
FIG. 9 is a side view of the connection member to which the wire is connected.

As shown in FIG. 5, the temperature sensor 50 includes the main body portion 51 that is made of a synthetic resin and that includes the temperature detection device, an arm-shaped spring portion 53 that is made of a synthetic resin and that protrudes upward from an upper surface of the main body portion 51, and a pair of lead wires 56 that are lead out from an end portion of the main body portion 51.

The temperature detection device (not shown) is accommodated in a bottom portion (lower end) of the main body portion 51. Extended portions 52 extended outward are provided on opposite sides of the main body portion 51 of the temperature sensor 50 with respect to a width direction. The front side of an end portion of each extended portion 52 with respect to the insertion direction constitutes a sloping surface, and has the function of guiding the main body portion 51 during insertion thereof underneath the protective wall 38.

The spring portion 53 is deformable so as to bend downward, and the locking protrusion 54 that is to be locked in the locking hole 39A of the protective wall 38 is formed on and protrude from an upper surface of the spring portion 53. Moreover, the locking operation portion 55, which is to be received and locked in the recess 39B of the protective wall 38 and whose locked state with respect to the protective wall 38 is released by pressing, is formed at an end portion of the spring portion 53, protruding upward therefrom. The spring portion 53 is disposed underneath the protective wall 38 and then energized in a direction in which the bottom portion (portion in which the temperature detection device is accommodated) of the main body portion 51 is brought into contact with the single cell 12.

The pair of lead wires 56 are connected to an external circuit, which is not shown, and configured such that signals from the temperature detection device are transmitted to the external circuit via the lead wires 56. The external circuit is disposed in, for example, a battery ECU, which is not shown, and configured to detect the temperature of the single cell 12 based on the signals from the temperature detection device.

Busbar 19

Each busbar 19 is composed of a substantially square plate material made of aluminum or an aluminum alloy. The busbar 19 includes a terminal connection busbar 19A that connects the electrode terminals 13 of adjacent single cells 12 to each other, and an external connection busbar 19B that connects the electrode terminal 13 of the relevant single cell 12 to an external device (not shown).

In the exemplary embodiment, the terminal connection busbar 19A includes a terminal connection portion 19E that is disposed so as to come into contact with the terminal blocks 13A of adjacent electrode terminals 13 of different polarities, an upwardly extending portion 19I extending upward from an end edge of the terminal connection portion 19E, and a wire connection portion 19F that is continuous with the upwardly extending portion 19I and to which the voltage detection wire 45 is connected (see FIGS. 6-9). That is to say, the upwardly extending portion 19I extending upward from the terminal connection portion 19E is formed between the terminal connection portion 19E and the wire connection portion 19F, and the terminal connection portion 19E and the wire connection portion 19F are provided in a stepped manner.

The electrode terminals 13 are electrically connected to the terminal connection portion 19E of the terminal connection busbar 19A. A pair of terminal through-holes 19D into which the respective electrode posts 13B are inserted are formed in the terminal connection busbar 19A, passing through the terminal connection busbar 19A.

The wire connection portion 19F is provided with a core wire connection portion 19G to which an exposed core wire 46 of the wire 45 is joined, and a crimping portion 19H that is crimped onto a portion of the wire 45 that is coated with an insulation coating 47.

The external connection busbars 19B are disposed so as to extend outward beyond the single cell group 11 in FIG. 1, and have a stepped shape as shown in FIGS. 4 and 5.

Each external connection busbar 19B includes an external device connection portion 191B that is formed at a position higher than the other portions and connected to the external device, a downwardly extending portion 191C that extends substantially vertically downward from the external device connection portion, a terminal connection portion 191A that is continuous with the downwardly extending portion 191C and is connected to the electrode terminal 13 of the single cell 12 at the end portion, the upwardly extending portion 191I, and the wire connection portion 19F.

A bolt-shaped external connection post 19C connected to the external device is formed on the external device connection portion 191B of the external connection busbar 19B, protruding therefrom. A screw thread 19E to which a nut (not shown) can be screwed is formed on an outer surface of this external connection post 19C.

A single terminal through-hole 19D into which the electrode post 13B of the corresponding single cell 12 at the end portion is inserted is formed in the terminal connection portion 191A of the external connection busbar 19B. The upwardly extending portion 191I of the external connection busbar 19B is the portion that is continuous with and extends upward from an end edge of the terminal connection portion 19E, and the wire connection portion 19F is the portion that is continuous with the upwardly extending portion 191I and to which the voltage detection wire 45 is connected. The wire connection portion 19F of the external connection busbar 19B also is provided with the core wire connection portion 19G to which the exposed core wire 46 of the wire 45 is connected, and the crimping portion 19H to be crimped onto a portion of the wire 45 that is coated with the insulation coating 47.

Voltage Detection Wire 45

Each wire 45 is formed by coating the core wire 46 made of aluminum or an aluminum alloy with the insulation coating 47 made of an insulating resin. The core wire 46 that is exposed by stripping away the insulation coating 47 at an end portion of the wire 45 is placed on the core wire connection portion 19G of the busbar and connected to the busbar 19 by welding. The crimping portion 19H is formed so as to project over the wire connection portion 19F in the width direction thereof, and is formed by crimping a pair of crimping pieces 191H onto a coated portion 48 of the wire 45.

Method for Assembling Battery Module M1

Next, a method for attaching the temperature sensor 50 will be described. The insulation coating 47 at the end portion of the voltage detection wire 45 is stripped away to expose the core wire 46 in advance. The exposed core wire 46 is placed on the wire connection portion 19F (core wire connection portion 19G) of the busbar 19 and welded and joined thereto by ultrasonic welding. The crimping pieces 191H of the busbar 19 are crimped onto the coated portion 48, of the end portion of this wire 45, that is coated with the insulation coating 47, and thus the wire 45 is connected to the busbar 19.

Next, the busbar 19 to which the wire 45 is connected is accommodated and held in the busbar holding portion 22 of the resin protector 20 constituted by the plurality of units 21 that are coupled to one another (see FIG. 4).

At or around the same time as the operation for installing the busbars 19 in the resin protector 20, eighteen single cells 12 are lined up such that the electrode terminals 13 of adjacent single cells 12 have opposite polarities, the sandwiching plates 18 are disposed at the respective end portions, and the separator 15 is attached to the side of the upper surfaces 14 of the single cells 12 on which the electrode terminals 13 are formed. The electrode terminals 13 are inserted into the respective terminal arrangement holes 16 of the separator 15, and thus the single cell group 11 in a state such as that shown in FIG. 4 is produced.

Next, when the wiring module 10 is put over and attached to the surface of the single cell group 11 to which the separator 15 is attached, such that the busbars 19 correspond to the appropriate electrode terminals 13, the electrode posts 13B are inserted into the terminal through-holes 19D of the busbars 19, the busbars 19 are brought into contact with the corresponding terminal blocks 13A, and the upper surfaces 14 of the single cells 12 are exposed at the sensor arrangement holes 17 of the separator 15.

Then, as shown in FIG. 5, the temperature sensor 50 is attached from above to the sensor holding portion 30 corresponding to the single cell 12 serving as the detection target. In a state in which the spring portion 53 is deformed so as to bend downward by pressing down the locking operation portion 55 of the spring portion 53, the main body portion 51 of the temperature sensor 50 is inserted from above the sensor holding portion 30 and moved in the direction indicated by arrow X. Then, the spring portion 53 of the temperature sensor 50 is guided by the sloping surface 38A of the protective wall 38, and also a lower surface of the main body portion 51 is guided by the sloping surface 35A of the bottom wall 35 of the sensor holding portion 30, so that the main body portion 51 is moved leftward in FIG. 2.

When the locking protrusion 54 formed on the upper surface of the spring portion 53 abuts against the protective wall 38, the spring portion 53 deforms so as to bend further downward. Furthermore, after the main body portion 51 of the temperature sensor 50 is moved in the direction indicated by arrow X, and the end portion of the main body portion 51 reaches a position at which it abuts against the restricting wall 40, when the state in which the locking operation portion 55 is pressed against is released, the spring portion 53 elastically returns, causing the locking protrusion 54 to fit into the locking hole 39A of the protective wall 38 and the locking operation portion 55 to be received in the recess 39B of the protective wall 38, and thus the forward movement of the main body portion 51 of the temperature sensor 50 in the attachment direction is restricted by the restricting wall 40. In this state, as shown in FIG. 2, the main body portion 51 of the temperature sensor 50 is disposed underneath the protective wall 38 and covered by the protective wall 38, and the bottom portion of the main body portion 51 is locked while being energized in the direction in which it is brought into contact with the upper surface 14 of the single cell 12.

After the temperature sensor 50 is attached to the sensor holding portion 30, nuts are screwed to the respective screw threads 13C of the electrode posts 13B of the single cells 12 to connect the electrode terminals 13 to the busbars 19, and the wires 45 connected to the busbars 19 are installed in the wire accommodation portions 41. Thus, the battery module M1 of the exemplary embodiment is obtained.

Effects

Next, the effects of the exemplary embodiment will be described.

In the exemplary embodiment, since the end portion of the voltage detection wire 45 is connected, by welding, to the busbar 19 that connects adjacent electrode terminals 13 to each other, no voltage detection terminal connected to the electrode terminals 13 is required. Moreover, the busbars 19 and the core wires 46 of the wires 45 used in the exemplary embodiment are made of aluminum or an aluminum alloy and thus result in a more lightweight wiring module than in the case where the busbars 19 and the like made of copper or a copper alloy are used. Therefore, according to the exemplary embodiment, the wiring module 10 having a reduced weight can be provided.

Furthermore, according to the exemplary embodiment, since the busbars 19 and the core wires 46 of the wires 45 are composed of the same metal material, the occurrence of galvanic corrosion due to, for example, intrusion of water containing salt can also be prevented in the core wire connection portions 19G where the core wires 46 are brought into contact with the busbars 19.

Moreover, according to the exemplary embodiment, since each busbar 19 is provided with the crimping portion 19H that is crimped onto the wire 45, the wire 45 can be held by the crimping portion 19H.

Incidentally, the wire 45 connected to the busbar 19 is pulled during routing to the battery module, and therefore, there is a fear that the wire 45 may be likely to be disconnected from the busbar 19 due to a stress that is applied to the connection portion (wire connection portion 19F) between the busbar 19 and the wire 45. However, according to the exemplary embodiment, since the busbar 19 is provided with the upwardly extending portion 19I extending upward from the terminal connection portion 19E between the terminal connection portion 19E connected to the electrode terminals 13 and the wire connection portion 19F connected to the exposed core wire 46, the stress is alleviated by the upwardly extending portion 19I, and thus the busbar 19 can be prevented from being disconnected from the wire 45.

Moreover, according to the exemplary embodiment, since the resin protector 20 that holds the busbars 19 is provided, and the resin protector 20 is provided with the wire holding grooves 29 each holding a portion of the wire 45 that is connected to the corresponding busbar 19, the connection portions between the wires 45 and the busbars 19 are held in the wire holding grooves 29, so that the state in which the wires 45 are connected to the busbars 19 is favorably maintained, and the connection reliability is thus increased.

Other Embodiments

The exemplary embodiment is not limited to the foregoing description and the embodiment that has been described using the drawings, and, for example, embodiments as described below are also embraced within the technical scope of the exemplary embodiment.

(1) In the foregoing embodiment, the busbars 19 each provided with the crimping portion 19H that is crimped onto the coated portion 48 of the wire 45 have been described. However, the busbars 19 may also include a core wire crimping portion that is crimped onto the exposed core wire of the wire or may include no crimping portion.

(2) In the foregoing embodiment, the busbars 19 in each of which the upwardly extending portion 19I is provided between the terminal connection portion 19E and the wire connection portion 19F have been described. However, a busbar having no upwardly extending portion may also be adopted.

(3) In the foregoing embodiment, an example in which the resin protector 20 provided with the wire holding portions 29, which individually hold that portion of the corresponding wire 45 that is connected to the busbar 19, is provided has been described. However, a resin protector having no wire holding portion may also be adopted.

LIST OF REFERENCE NUMERALS

M1 Battery module
10 Wiring module
11 Single cell group
12 Single cell
13 Electrode terminal
19 Busbar (connection member)
19A Terminal connection busbar
19B External connection busbar
19D Terminal through-hole
19E, 191A Terminal connection portion
19F Wire connection portion
19G Core wire connection portion
19H Crimping portion (crimping piece)
19I Upwardly extending portion
20 Resin protector
22 Busbar holding portion
29 Wire holding groove (wire holding portion)
29A Wire retaining portion
41 Wire accommodation portion
42B Accommodation bottom wall
42A Wire accommodation wall
43 Wire retaining piece
45 Wire
46 (Exposed) core wire
47 Insulation coating
48 Coated portion

The invention claimed is:

1. A wiring module for use in an automobile, the wiring module being attached to a battery module including a single cell group in which a plurality of single cells having a plurality of electrode terminals are lined up, the plurality of electrode terminals including a plurality of positive electrode terminals and a plurality of negative electrode terminals, the wiring module comprising:

a voltage detection wire formed by coating a core wire made of aluminum or an aluminum alloy and being coated with an insulation coating;

a connection member made of aluminum or an aluminum alloy, the connection member electrically connecting adjacent electrode terminals of the plurality of electrode terminals to each other, the connection member including:

a wire connection portion having a crimping portion being crimped onto a coated portion of the voltage detection wire that is coated with the insulation coating, a terminal connection portion connected to the plurality of electrode terminals; and an upwardly extending portion connecting the terminal connection portion to the wire connection portion, the terminal connection portion and the wire connection portion being vertically offset to each other, and the upwardly extending portion being perpendicular to the terminal connection portion and the wire connection portion, wherein:

the voltage detection wire includes an exposed core wire that is exposed at an end portion of the voltage detection wire, and the exposed core wire is connected between the crimping portion and the terminal connection portion of the connection member by welding.

2. The wiring module according to claim 1, further comprising:

a wire connection portion of the connection member connected to the exposed core wire; and an upwardly extending portion of the connection member extending upward from the terminal connection portion being provided between the terminal connection portion and the wire connection portion.

3. The wiring module according to claim 2, further comprising:

a resin protector holding the connection member, the resin protector being provided with a wire holding portion that holds a portion of the voltage detection wire connected to the connection member.

4. The wiring module according to claim 1, further comprising:

a resin protector holding the connection member, the resin protector being provided with a wire holding portion that holds a portion of the voltage detection wire connected to the connection member.

5. The wiring module according to claim 1, further comprising:

a temperature sensor held in a sensor holding portion of a resin protector, the sensor holding portion including a pair of side wall portions being disposed substantially parallel to a direction in which the plurality of single cells are arranged, and a separation wall separating adjacent sensor holding portions.

6. The wiring module according to claim 1, wherein a first plane of the terminal connection portion does not intersect a second plane of the wire connection portion.

* * * * *